Patented Nov. 20, 1928.

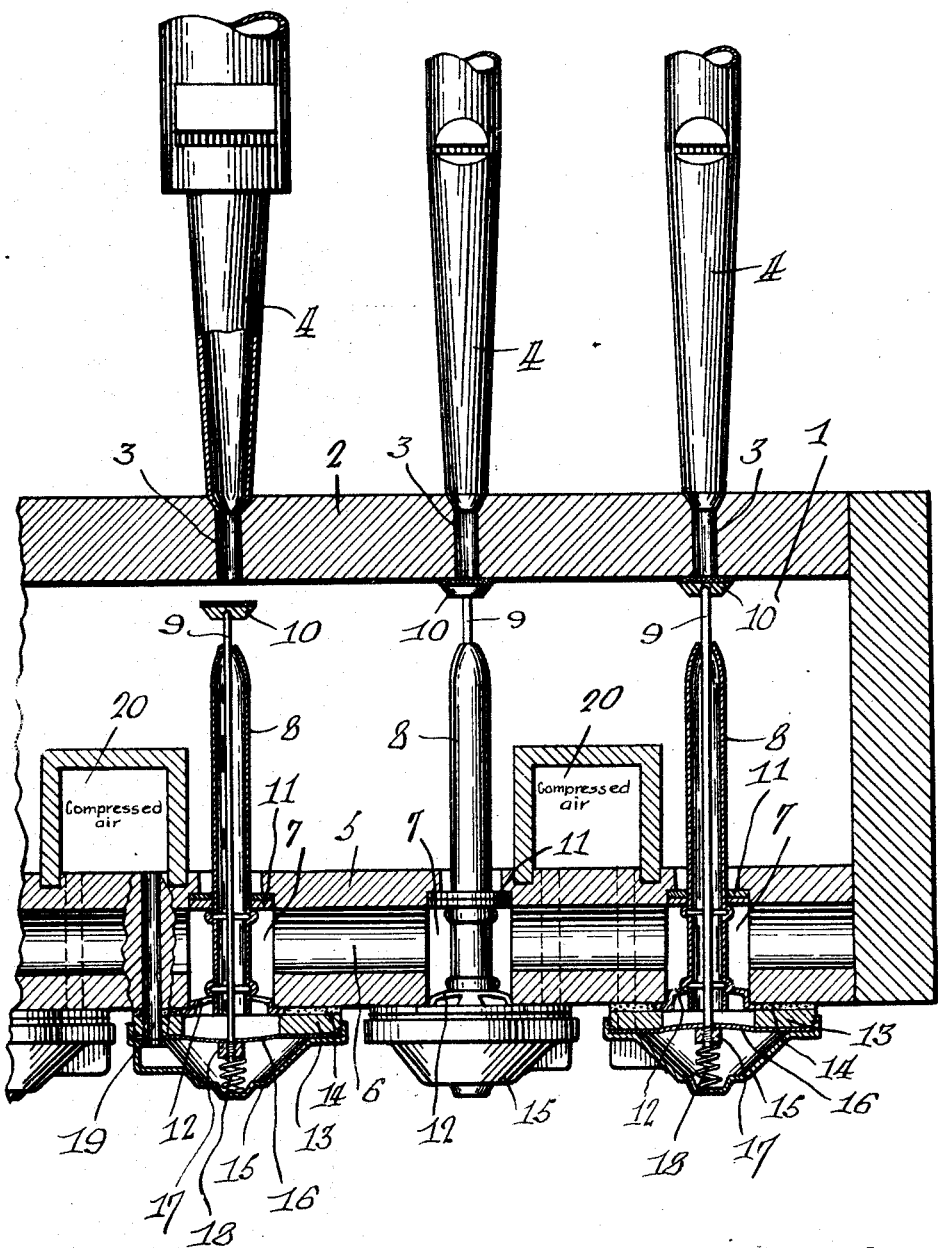

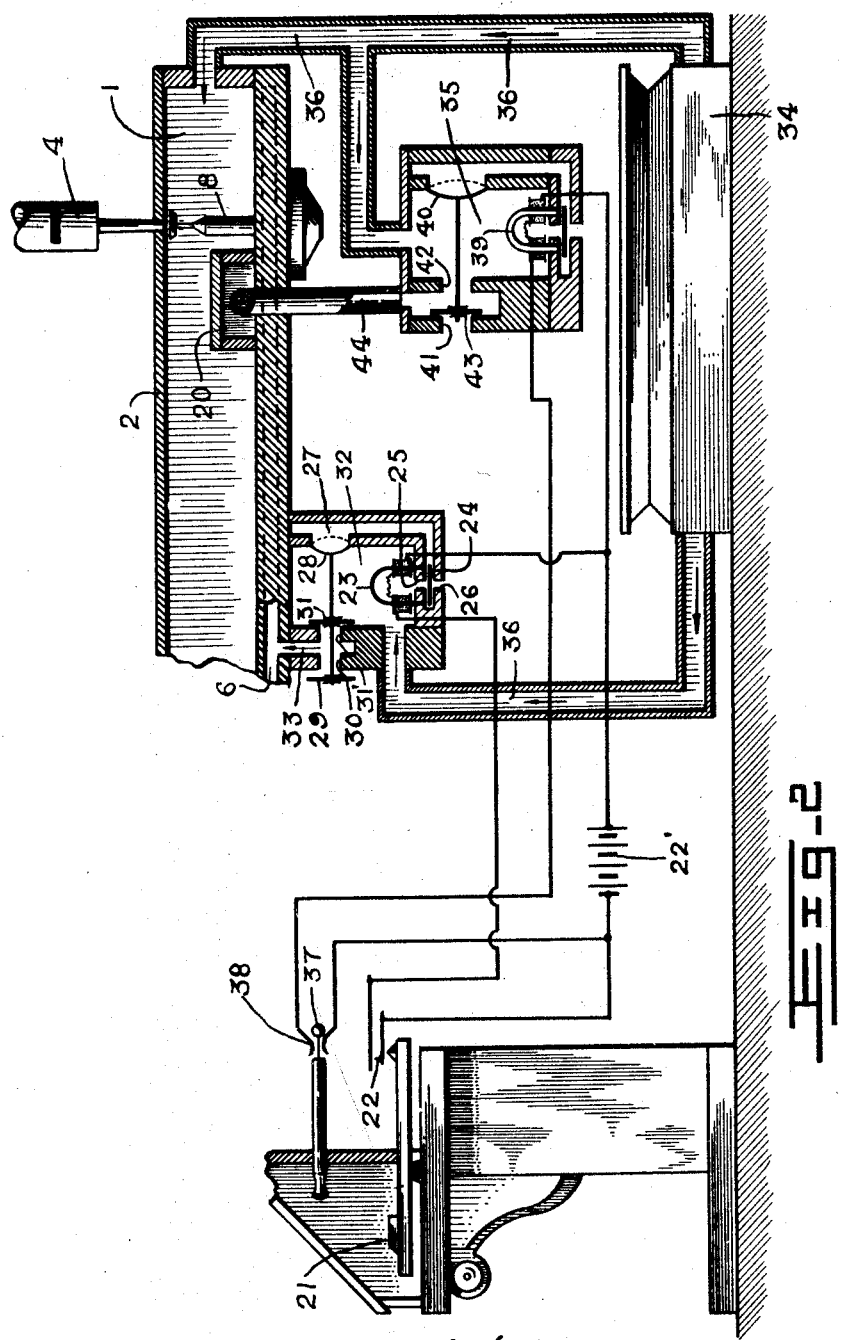

1,692,507

UNITED STATES PATENT OFFICE.

FRÉDÉRIC LAMONTAGNE, OF MONTREAL, QUEBEC, CANADA.

PNEUMATIC ACTION FOR PIPE ORGANS.

Application filed September 8, 1925. Serial No. 55,150.

The present invention pertains to a novel mechanism for affecting a pneumatic action in pipe organs.

The principal object of the invention is the provision of a construction of this character operating a stop device for closing the pipe of an organ in order to terminate the sounding of the pipe.

The apparatus comprises a chamber for each pipe of the organ, each chamber containing a diaphragm for controlling the valve of the corresponding pipe. A conduit board is provided at the bottom of the usual air chest and is formed with a conduit to which the upper faces of a line of diaphragms are disposed. At the lower face of each diaphragm is a spring which normally holds the valve in closed position. When air is caused to flow through the conduit, it acts on the upper faces of the diaphragm, overbalances the springs and opens the valves.

The stop action for closing the valves is obtained through a series of ducts independent of the main conduit and leading to the lower faces of the diaphragms. These ducts receive an independently controlled air supply which, when in operation, balances the pressure on the upper face of the diaphragms. At this time the spring acting on the valve is unbalanced and consequently closes the valve.

The invention is fully disclosed in the following description and in the accompanying drawings in which:

Figure 1 is a longitudinal section of a construction made according to the invention.

Figure 2 is a diagrammatic view of the usual devices associated with the invention for operating said invention.

Reference to these views will now be made by use of like characters which are employed to designate corresponding parts throughout.

The numeral 1 indicates the usual air chest, the top of which comprises a board 2 having a plurality of pipe ports 3 communicating with the organ pipes 4.

At the bottom of the chest is placed a conduit board 5 having a longitudinal conduit 6 for each row of pipes. Beneath each pipe, a recess 7 is formed through the board 5 for the purpose of supplying air to a stop action unit. Each recess 7 contains and supports the lower end of a tubular guide member 8 in the axis of which is disposed a slidable valve stem 9. The stem carries a valve 10 at its upper end adapted to control one of the ports 3. The upper end of the recess is closed from the chest 1 by means of a double disc 11 surrounding the guide member and bearing against the inner wall of the recess.

The lower extremity of the portion of the guide 8 within the recess 7 is engaged by a spring plate 12 which urges the guide upwardly and thereby holds the disc 11 firmly in position. At the lower face of the spring plate is positioned a diaphragm holder or ring 13 with a washer 14 placed between it and the bottom of the conduit board 5. To this holder is secured a diaphragm chamber 15 which clamps a flexible diaphragm 16 between it and the holder. The valve stem 9 is passed through the diaphragm and held against it by means of a nut 17 threaded on the stem. An expansion spring 18 is placed between the nut 17 and the bottom of the chamber thereby urging the valve upward to closed position.

For each such chamber the conduit member has a vertical duct 19 extending from the top of the board to the region of the chamber beneath the diaphragm. This duct is independent of the conduit 6 and out of communication therewith.

The ducts 19 are sealed from the chest 1 by means of air channel members 20 mounted on the top of the board 5. These channels convey compressed air to the ducts 19 and usual operating devices are provided at the key board of the instrument for controlling the flow of air through the channels.

The control apparatus now to be described is substantially shown and described by Oliver C. Faust in his book "A treatise on the construction, repairing and tuning of the organ".

The note key is designed to control the flow of air through the conduit 6 whereby pressure is created on the upper surface of the diaphragm. This pressure is greater than the counter-pressure of the spring 18, as a result of which the diaphragm is lowered carrying with it the valve stem 9 and head 10 and thus opening the corresponding port 3.

By referring to Figure 2, it will be seen how the air pressure is supplied to the chest 1 and duct 6. The air is originally compressed by the bellows 34 and delivered to the chest 1 and the chambers 32 and 35 by means of the trunks 36; thus, it will be understood that there is, normally, an air pressure inside the said chambers and chest.

When it is desired to sound a certain pipe, the corresponding note key 21 at the keyboard is depressed, thereby closing the contacts 22. The closing of the said contacts will energize the magnet 23, whereby the armature 24 will be drawn upwardly, closing at the same time the aperture 25 and disclosing aperture 26. The aperture 26 being open to the atmosphere, any compressed air originally imprisoned in the chamber 27, will escape and the diaphragm 28 having air pressure on one side only will immediately take a position inside the said chamber, (as shown in dotted lines, Figure 2) thereby drawing the valve 29 inwardly and closing the port 30. The complementary valve 31 will be also drawn away from said port 30, thereby allowing the compressed air inside the chamber 32 to enter the port 31', the duct 33, then along duct 6 to the upper surface of the diaphragm of a selected organ pipe.

As explained before, the air pressure on top of the diaphragm will lower the same against the tension of the spring 18, the rod 9 and valve 10 will also affect a downward movement thereby opening the port 3. The air, under pressure, inside the chest 1 will then enter the pipe 4 and cause same to sound.

When the note key, at the keyboard, is released, the contacts will accordingly be opened, and the magnet, receiving no flow of current from the battery 22' will drop the armature 24, thereby closing the aperture 26. The compressed air now enters the chamber 27 through the open aperture 25 and equalizes the air pressure on both sides of said diaphragm 28, which by virtue of its natural curvature will assume the position shown in Figure 2, whereby the valve 31 will close the port 31' and shut off the air necessary to sound the organ pipe, thereby silencing same.

Up to now, it was assumed that all the pipes of the same note were sounded in all the registers, which means that all the "step knobs", at the organ keyboard, were pulled out.

Supposing now, that it is wanted to play a certain soft selection and that it is desired to use pipes of a mellow tone. All the step knobs being pushed home, I select, for instance, "Angel voices" and "Celesta", as being adapted to properly render the selection. The corresponding step knobs are accordingly pulled out. By doing this, the contacts 38 will be short-circuited by the brass ball 37 and the magnet 39 thereby energized. As described before, the armature will close the upper aperture and one side of the diaphragm 40 will be in communication with the atmosphere while the other side being under pressure, said diaphragm 40 will assume the position shown in dotted lines, Figure 2. This movement of the diaphragm will open the port 41 and close 42, by means of the valve 43. The duct 44 being in turn open to the atmosphere will allow the escape of any air therein and under the diaphragm 16. Now, if we depress a note key, at the keyboard, air will be admitted on top of the diaphragm 16, thereby sounding the corresponding pipe, as before described. All the other pipes of the same note, the corresponding step knobs of which were not pulled out, will be silent, for the following reason. When the brass ball 37 is disengaged from the contacts 38, the magnet 39, receiving no flow of current from the battery 22', will drop its armature thereby closing the lower aperture and opening the upper one. Air is then admitted to the right side of diaphragm 40, equalizing the pressure on both sides of said diaphragm. Said diaphragm will then cause the valve 43 to close the port 41 and open 42, as already explained.

The port 42 being open, compressed air will enter said port, issue in duct 44 to the under face of diaphragm 16. Now, if any air is admitted on top of said diaphragm, the pressure on both sides of same will be equalized, and the spring 18 will tend to force said diaphragm upwardly thereby closing port 3 by means of valve 10, and rendering the corresponding organ pipe ineffective.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A pneumatic action for pipe organs comprising in combination with an air chest and an organ pipe communicating therewith, an air conduit member, an air chamber intersecting said conduit, a diaphragm having one side exposed to said chamber, said member having a duct independent of the conduit and leading to the other side of said diaphragm, a valve connected to said diaphragm and adapted to engage directly the inlet of said pipe, and a chamber containing compressed air.

2. A pneumatic action for pipe organs comprising in combination with an air chest and an organ pipe communicating therewith, an air conduit member, an air chamber intersecting said air conduit, a diaphragm chamber disposed beneath the air chamber and exterior of said conduit member, a diaphragm supported in the diaphragm chamber and having one side exposed to the air chamber, said conduit member having a duct independent of the conduit and entering the diaphragm chamber at the other side of the diaphragm, a valve connected to said diaphragm and adapted to control said pipe, and a chamber containing compressed air.

3. A pneumatic action for pipe organs comprising in combination with an air chest and an organ pipe communicating therewith, an air conduit member, an air chamber intersecting said air conduit, a diaphragm chamber disposed beneath the air chamber and exterior of said conduit member, a diaphragm supported in the diaphragm chamber and having one side exposed to the air chamber, said conduit member having a duct independent of the conduit and entering the diaphragm chamber at the other side of the diaphragm, a valve connected to said diaphragm and adapted to control said pipe, a spring in the diaphragm chamber and adapted to bring the valve to closed position, and a chamber containing compressed air.

4. A pneumatic action for pipe organs comprising in combination with an air chest and an organ pipe communicating therewith, an air conduit member, an air chamber intersecting said air conduit, a diaphragm chamber disposed beneath the air chamber and exterior of said conduit member, a diaphragm supported in the diaphragm chamber and having one side exposed to the air chamber, said conduit member having a duct independent of the conduit and entering the diaphragm chamber at the other side of the diaphragm, a valve connected to said diaphragm and adapted to engage directly the inlet of said pipe, a spring connected to said valve and adapted to bring the valve to closed position, and a chamber containing compressed air.

5. A pneumatic action for pipe organs comprising in combination with an air chest and an organ pipe communicating therewith, an air conduit member, a diaphragm having one side exposed to said conduit, an independent chamber containing compressed air and adapted to supply the same to the other side of said diaphragm, and a valve connected to said diaphragm and adapted to engage directly the inlet of said pipe.

In witness whereof I have hereunto set my hand.

FRÉDÉRIC LAMONTAGNE.